Sept. 10, 1935.  J. LEISTER  2,013,967

APPARATUS FOR EQUALIZING DRIVING BELTS

Filed April 19, 1932

Witnesses:

Inventor:

Julius Leister

Patented Sept. 10, 1935

2,013,967

UNITED STATES PATENT OFFICE 2,013,967

APPARATUS FOR EQUALIZING DRIVING BELTS

Julius Leister, Berlin-Zehlendorf, Germany, assignor, by mesne assignments, to Hermann Bothe, Berlin, Germany Application April 19, 1932, Serial No. 606,196
In Germany September 4, 1931

2 Claims. (Cl. 69—1)

In the manufacture of endless driving belts a difficulty arises from the fact that the joining of the ends of the belt results in a thickened portion which may cause undesirable noise and, under certain conditions, sliding of the belt with consequent irregularity in the power transmission. The present invention obviates these disadvantages by skiving or evening the endless belt prior to use. The skiving is accomplished by passing the belt over a roller rotating about a fixed axis in front of which a knife is mounted for axial and radial movements relative to the roller.

Two embodiments of the invention are illustrated by way of example in the accompanying drawing, in which:—

Figure 1:
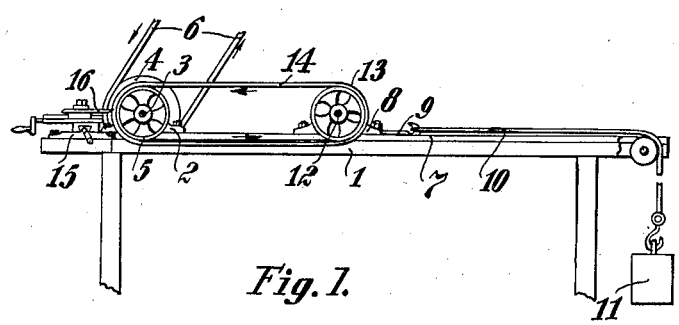
Fig. 1 shows in side elevation an apparatus with a cutter adapted to bear against the outer side of the belt.
Figure 2:
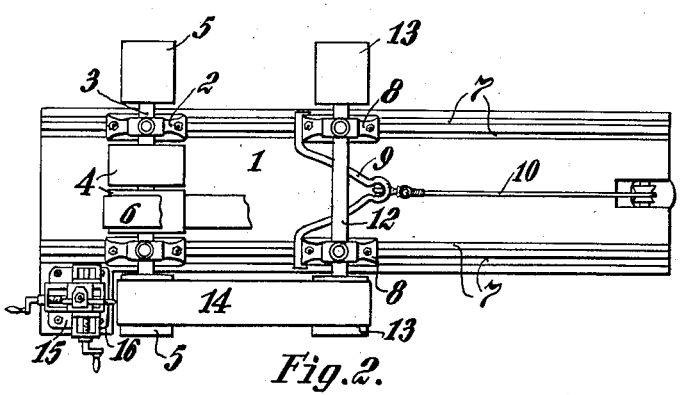
Fig. 2 is a plan view of Fig. 1.

A table 1 carries fixed bearings 2 in which a stationary shaft 3 is journalled on which fixed and loose pulleys 4 are mounted between the bearings 2 and driven by a driving belt 6. Smooth supporting rollers 5 are mounted one on each of the free ends of the shaft 3. Guide rails 7 are arranged on the table 1 extending parallel to the longitudinal edges thereof and on these rails bearings 8 are slidably mounted and connected by a strap 9 which is connected at one end to a pulling cord 10 carrying at its other end a weight 11. A shaft 12 is journalled in these bearings 8 and guide pulleys 13 are mounted one on each end of the shaft 12. The belt 14 to be evened is placed over one of the supporting rollers 5 and the corresponding guide pulley 13, being kept taut by the weight 11 tending to pull the bearings 8 together with the shaft 12 and pulleys 13 away from the stationary shaft 3. In front of the supporting roller carrying the belt to be evened a slide rest 15 is located carrying a cutter 16 adapted to be adjusted both axially and radially to the supporting roller to operate on the outer side of the belt to be evened. It is evident that this adjustment can be carried out by hand by means of cranks as shown in the drawing or mechanically by means of a spindle gearing or the like.

Figure 4:
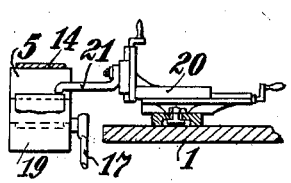
Fig. 4 is a section on line A—B of Fig. 3.
Figure 3:
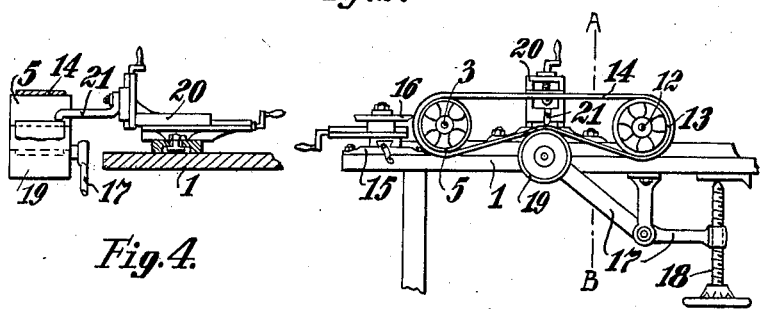
Fig. 3 shows in side elevation an apparatus with two cutters adapted to bear one against the outer side and the other against the inner side of the belt.

As shown in Figs. 3 and 4 a second supporting roller 19 is mounted on one end of a two-armed lever 17 pivotally mounted on the under side of the table 1. A screw spindle 18 engages the other end of this lever 17 and bears against the under side of the table, so that by adjusting this spindle the lever 17 is rocked and the supporting roller 19 raised and lowered to press from below more or less strongly against the under side of the belt to be evened between the supporting roller 5 and guide pulley 13.

A second slide rest 20 is mounted on the table adjacent the supporting roller 19 and carries a cutter 21 adapted to be shifted axially and radially to the roller 19 to even the inner side of the belt running over the supporting roller 5 and pulley 13. By this arrangement the belt can be evened on both sides at the same time, the outer side being evened by the cutter 16 and the inner side by the cutter 21.

What is claimed is,

1. In an apparatus for evening endless belts the combination of a smooth supporting roller, rotating about a fixed axis, over which the belt is guided, a cutter arranged in front of said roller and adapted to operate upon the outer side of the belt, and means for positively shifting said cutter axially and radially of said roller.

2. In an apparatus for evening endless belts as specified in claim 1 the combination with the roller and the shiftable cutter in front of said roller of a guide pulley for the belt, a second adjustable roller arranged between said first mentioned roller and said guide pulley, a second cutter adapted to bear against the inner side of the belt, and means for shifting said second cutter axially and radially of said second roller.

JULIUS LEISTER.